(12) United States Patent
Jayaram et al.

(10) Patent No.: US 7,845,249 B2
(45) Date of Patent: Dec. 7, 2010

(54) SINGLE MOTOR TRANSMISSION SHIFTING MECHANISM FOR A MOTOR VEHICLE TRANSMISSION

(75) Inventors: Mavinkal Jayaram, Broadview Hts., OH (US); Trevor McConnell, Rittman, OH (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 560 days.

(21) Appl. No.: 11/899,815

(22) Filed: Sep. 7, 2007

(65) Prior Publication Data

US 2008/0060462 A1    Mar. 13, 2008

Related U.S. Application Data

(60) Provisional application No. 60/843,039, filed on Sep. 8, 2006.

(51) Int. Cl.
*F16H 59/00* (2006.01)
*F16H 3/34* (2006.01)
*B60K 17/04* (2006.01)

(52) U.S. Cl. .......................... 74/335; 74/352; 74/473.12

(58) Field of Classification Search .................. 74/127, 74/335, 352, 353, 354, 396, 397, 424.71, 74/473.12, 471 XY See application file for complete search history.

(56) References Cited

U.S. PATENT DOCUMENTS

| 5,689,997 | A | * | 11/1997 | Schaller | 74/335 |
| 5,901,608 | A | * | 5/1999 | Takeyama | 74/335 |
| 5,916,326 | A | * | 6/1999 | Tischer | 74/335 |
| 6,334,371 | B1 | * | 1/2002 | Stengel et al. | 74/473.12 |
| 6,389,919 | B1 | * | 5/2002 | Hennequet et al. | 74/473.37 |
| 7,219,571 | B2 | * | 5/2007 | McCrary | 74/335 |

FOREIGN PATENT DOCUMENTS

DE    10 2004 038 955 A1    3/2005

* cited by examiner

*Primary Examiner*—Roger Pang
(74) *Attorney, Agent, or Firm*—Simpson & Simpson, PLLC (57) ABSTRACT

A single motor transmission shifting mechanism with exactly one electric motor for generating drive motions for selecting, and for generating drive motions for shifting gears of a motor vehicle transmission device, and with a threaded spindle for switching from a mode, in which selection motions can be effectuated, into a mode, in which shifting motions can be effectuated, and with a shifting shaft, which can be moved in axial direction for selecting, and which can be rotated around its longitudinal axis for shifting, wherein all components, transferring the drive load for shifting from the electric motor to the shifting shaft during shifting operation, maintain their axial position relative to the longitudinal axis of the threaded spindle during this shifting operation.

4 Claims, 10 Drawing Sheets

Fig. 20b

SINGLE MOTOR TRANSMISSION SHIFTING MECHANISM FOR A MOTOR VEHICLE TRANSMISSION

CROSS REFERENCE TO RELATED APPLICATIONS

This application claims the benefit under 35 U.S.C. §119(e) of U.S. Provisional Application No. 60/843,039, filed Sep. 8, 2006, which application is incorporated herein by reference.

FIELD OF THE INVENTION

The invention relates to a single motor shifting mechanism for a motor vehicle transmission.

BACKGROUND OF THE INVENTION

Conventional shifting mechanisms, through which shifting motions were accomplished through electric motors, were provided, so that an electric motor was provided for generating selection motions, and an electric motor was provided for generating shifting motions. Meanwhile, however, also transmission shifting mechanisms are known, which only have one, or exactly one, electric motor, through whose drive motions, actuating motions for selecting and also actuating motions for shifting gears can be caused. Transmission shifting mechanisms of the latter kind are also called single motor transmission shifting mechanisms, since they only have one or exactly one electric motor.

Embodiments of such single motor transmission shifting mechanisms are disclosed in unpublished U.S. Patent Application Nos. 60/750,538; 60/750,555; 60/750,571; 60/750,572; 60/750,554; 60/750,527; 60/750,526 and 60/750,688 of the applicant, all of which are incorporated herein by reference. Also DE 10 2004 038 955 A1 of the applicant discloses exemplary embodiments of a single motor transmission shifting mechanism.

As can be seen, in particular, also from the state of the art, known single motor transmission shifting mechanism are often, or typically provided, so that they are driven by a threaded spindle.

While in the known embodiments of single motor transmission shifting mechanisms, a threaded spindle is often used to generate a high torque, which is necessary for the shifting motion, the problem of low efficiency (approximately 70%) exists, which is mostly due to the arrangement and connection of the threaded spindle. This requires an electric motor or a servo motor in the known embodiments, which is sized, so that it compensates the torque losses.

From U.S. Patent Application No. 60/750,538 of the applicant, furthermore, a design is known, in which nuts and tubes are being used, wherein coupling ears are provided, to couple them in rotation, while an axial motion is allowed. It has become evident that in some cases these parts are difficult to manufacture and very expensive. With this background, an alternative design for the design is desirable, which is simpler in manufacture.

SUMMARY OF THE INVENTION

The object of the invention is to provide a single motor transmission shifting mechanism, which is reliable in operation, and simple to manufacture.

In the design according to the invention, it is provided, in particular, that it is formed as a gear driven design. According to one embodiment, it is thus provided that the single motor transmission shifting mechanism has a threaded spindle, which, however, is used for switching between selecting and shifting, and therefore, the high friction losses in the area of the threaded spindle do not occur. Thus, in particular for shifting and laying out the gears, the principle that a nut or something similar is moved along a spindle is not employed. It is provided, in particular, that the greatest percentage of the motor torque is transmitted into the area of the output shaft, or the shifting shaft. This allows the use of smaller electric, or servo motors, or to generate a higher torque output with the same motor size.

The design can be provided, in particular, so that intermediate transmission gears are used, which are provided similar to those in a differential of rear wheel driven vehicles, or motor vehicles.

BRIEF DESCRIPTION OF THE DRAWINGS

Subsequently, exemplary embodiments, according to the invention, will be described with reference to the figures, whereby, however, the invention is not limited. It is shown in the several views of the drawings, wherein.

DETAILED DESCRIPTION OF THE INVENTION

Figure 1:
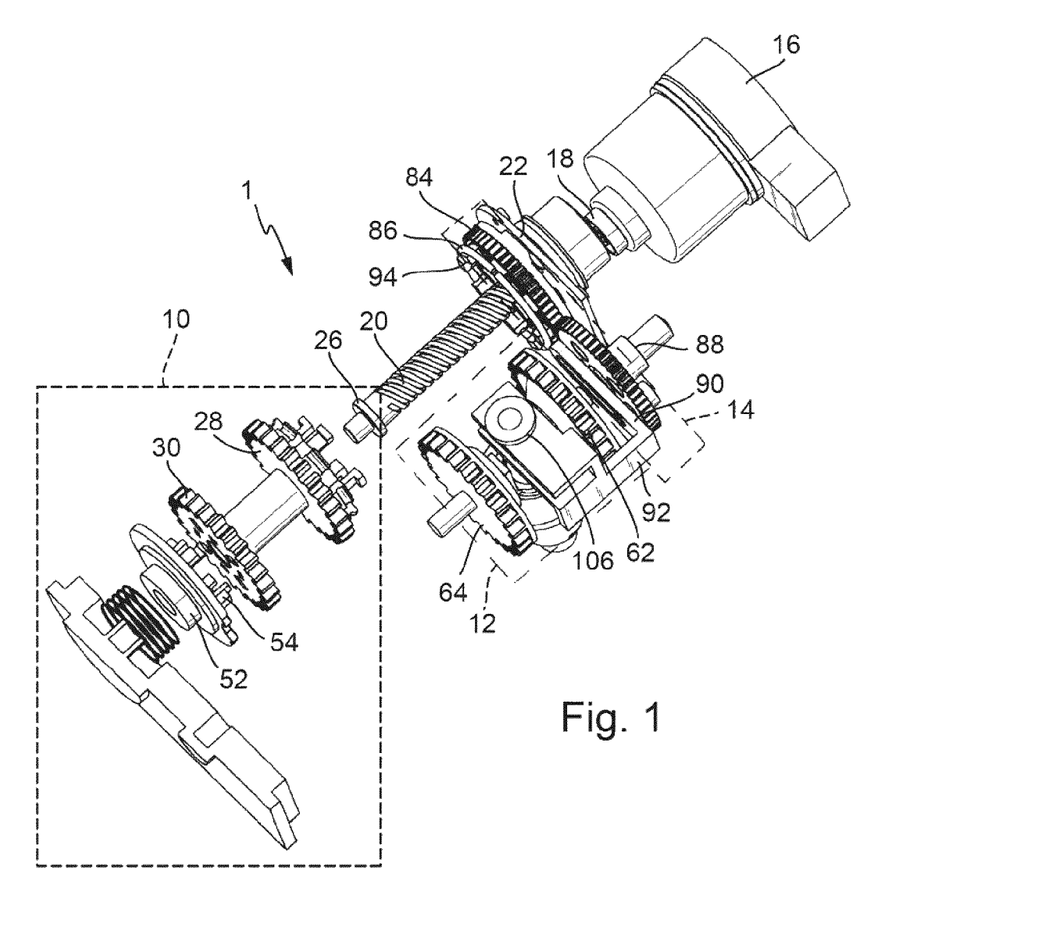
FIGS. 1-10 show a first exemplary single motor transmission shifting mechanism, according to the invention, in different schematic views; and, FIGS. 11-20*b* show a second exemplary single motor transmission shifting mechanism in various schematic views.

FIG. 1 shows a three-dimensional exploded view of an exemplary single motor transmission shifting mechanism 1, or a single motor transmission shifting unit 1 in a schematic view. The single motor transmission shifting mechanism 1 consists of three modules 10, 12, 14, or comprises three modules 10, 12, 14. First module 10 of these three modules 10, 12, 14 is a select shift switching mechanism; a second one of the modules 10, 12, 14 is shifting mechanism 12; third module 14 of these three modules 10, 12, 14 is gear selecting mechanism 14. The single motor transmission shifting mechanism 1 furthermore comprises one, or exactly one electric motor 16. Together with electric motor 16, or exactly one electric motor 16, the three components, or modules 10, 12, 14 for selecting and shifting gears in a transmission that is not shown, or in a motor vehicle transmission device, can be used.

Figure 2:
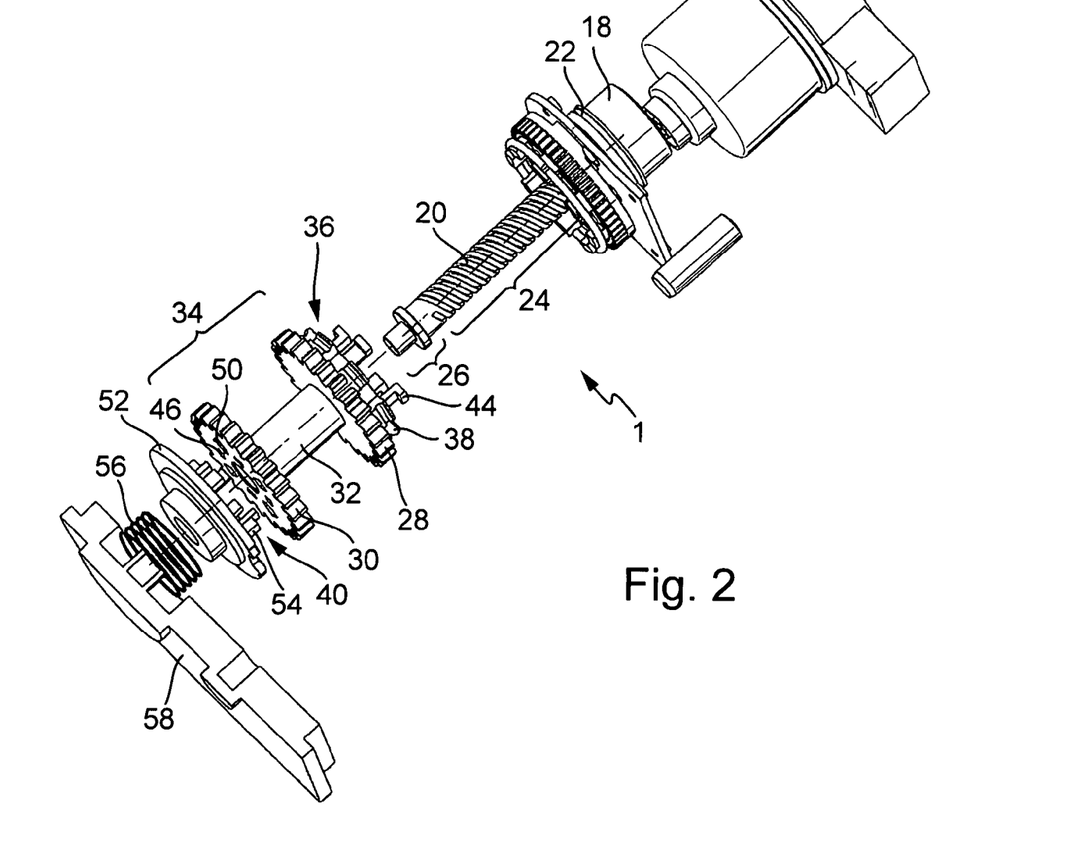

FIG. 2 shows a three-dimensional exploded view of the exemplary transmission shifting mechanism, according to the invention, according to FIG. 1, in which some of the components shown in FIG. 1 have been omitted, wherein in FIG. 2, in particular, a perspective exploded view of selecting-shifting switching mechanism 10 is shown. This selecting-shifting switching mechanism 10 has reduction gear 18, which engages non-rotatably with electric motor 16, or its motor output shaft, and into threaded spindle 20. Threaded spindle 20 can thus be driven through electric motor 16 via interconnected reduction gear 18, selectively in one, or in the other direction of rotation. Threaded spindle 20 is supported through bearing 22. Threaded spindle 20 has threaded section 24 and flange section 26. Selecting-shifting switching mechanism 10, furthermore, has two gears, in particular, tandem gears 28, 30. Furthermore, selecting-shifting mechanism 10 comprises connection tube 32. Tandem gears 28, 30 are each fixated to one end of connection tube 32, which holds tandem gear assembly 34. This is performed, in particular, so that first tandem gear 28 is disposed at the one axial end of connection tube 32, and second tandem gear 30 is disposed at the other axial end of the connection tube. Connection tube 32 has an inner, or radially inner bolt shaped section, or threaded section, not shown in the figures, forming an opposite piece with respect to outer threaded section 34, which is provided on threaded spindle 20. This means that connection tube 32 is provided for thread engagement into threaded spindle 20. Tandem gear assembly 34, furthermore, comprises flange area 36, which is provided adjacent, or axially adjacent to first tandem gear 28, and a set of first axial protrusions 38 with rounded grooves, and a second set of axial protrusions with radial lobes or ears.

Second tandem gear 30 furthermore comprises a first row of first slots 46, which are disposed with equidistant spacing around the central axis, and a second row of longitudinal second slots 50, which are provided with an offset in rotation direction from the first row, and which are disposed with equidistant spacing around the axis. Mechanism 10, furthermore, comprises switching unit 52 for shifting gears, which is mounted rotatably on threaded spindle 20.

Figure 3:
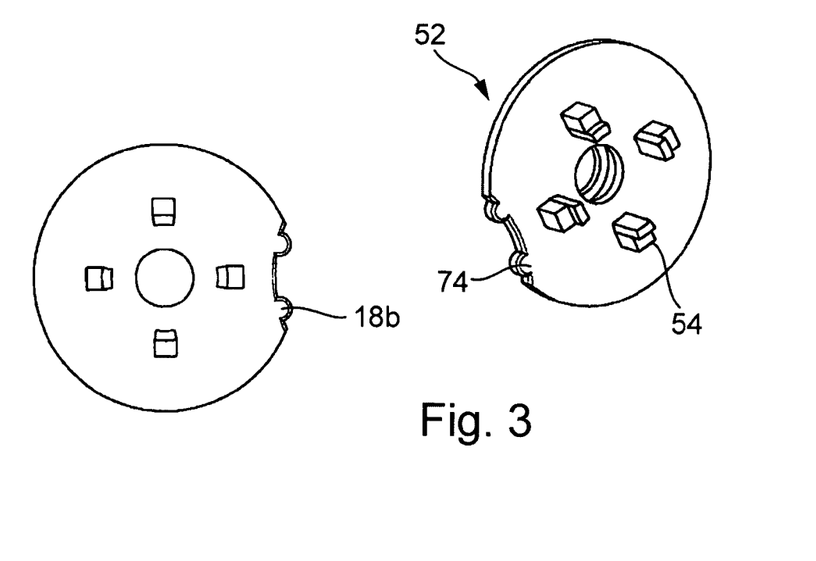

FIG. 3 shows a detail view of switching unit 52 for shifting. Switching unit 52 comprises two components, connected to each other in a solid manner, which are disposed, so that they can slide, or be moved over the cylindrical surface of threaded spindle 20, wherein flange area 36 is captured in between. Switching unit 52 for switching operation furthermore comprises stepped axial protrusions 54, which are sized so that they engage, or can engage into first slots 46, and can engage into longitudinal second slots 50 of tandem gear 30. This means that a stepped area of each axial protrusion 54 is sized for the engagement into first slots 46 in tandem gear 30, and a second area of each axial protrusion 54 is sized for the engagement into second longitudinal slots in tandem gear 30. When the stepped area engages into first slot 46 of second tandem gear 30, an annular area of switching unit 118 is positioned at an elevation for shifting, which is remote from second tandem gear 50, and thus corresponds to length L of the non stepped area of axial protrusion 54, which is not shown in the figures. When axial protrusion 54 engages into second longitudinal slot 50 in second tandem gear 30, the annular surface of switching unit 52 remains at second tandem gear 30 for the shifting. Furthermore, coil spring 56 is provided. Furthermore, housing 58 is provided. Coil spring 56 is disposed between housing 58 and switching unit 52 for shifting, and presses switching unit 52 against flange area 36 of threaded spindle 20 for shifting.

Mechanism 100 is assembled as follows:

The shifting unit for shifting is mounted above flange area 36 of threaded spindle 20. In a certain sense, switching unit 52 has an indentation or a depression, and flange area 36 moves or slides within this indentation or depression, and remains at the bottom of this indentation or this depression.

Next, connection 32 of tandem gear assembly 34 is brought into threaded engagement with threaded spindle 20, so that second tandem gear 30 is adjacent to slots 46 and longitudinal slots 50 to axial protrusions 54 of switching 52 unit for shifting. Selection gear 60 and bearing assembly 22 are positioned on threaded spindle 20, before the reduction gear is brought into rotatable engagement with threaded spindle 20. Coil spring 56 is mounted against switching unit 52 for shifting, before threaded spindle 20 is inserted into the housing.

Figure 4:
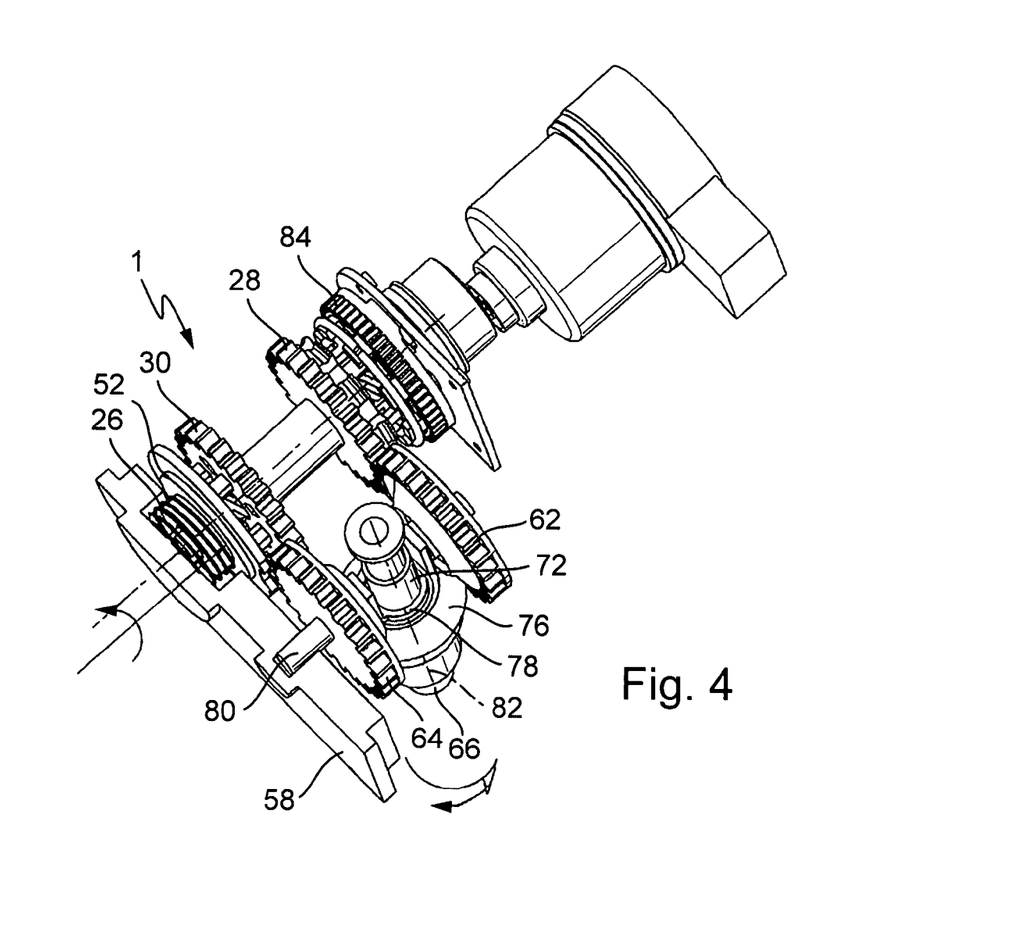

FIG. 4 shows a perspective view of a section of single motor transmission shifting mechanism 1, which is disposed in order to engage into a gear in circumferential direction.

Figure 5:
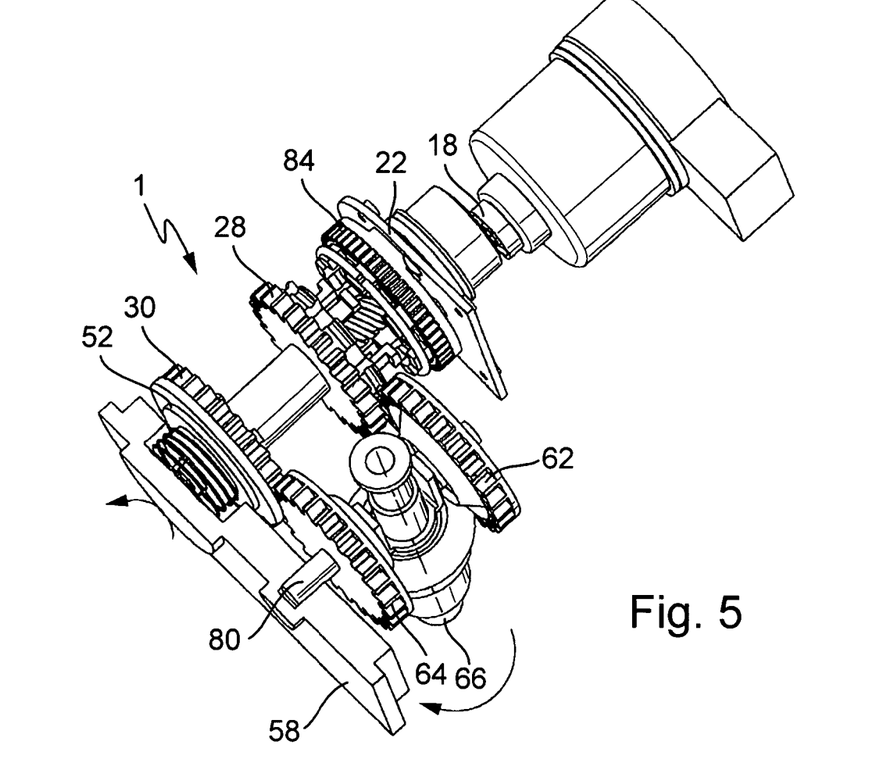

FIG. 5 shows a perspective view of a section of the single motor transmission shifting mechanism 1, which is disposed to engage into a gear in counter clockwise direction. Shifting mechanism 12 comprises intermediate bevel gears 62 and 64, and shifting shaft 66.

Figure 6:
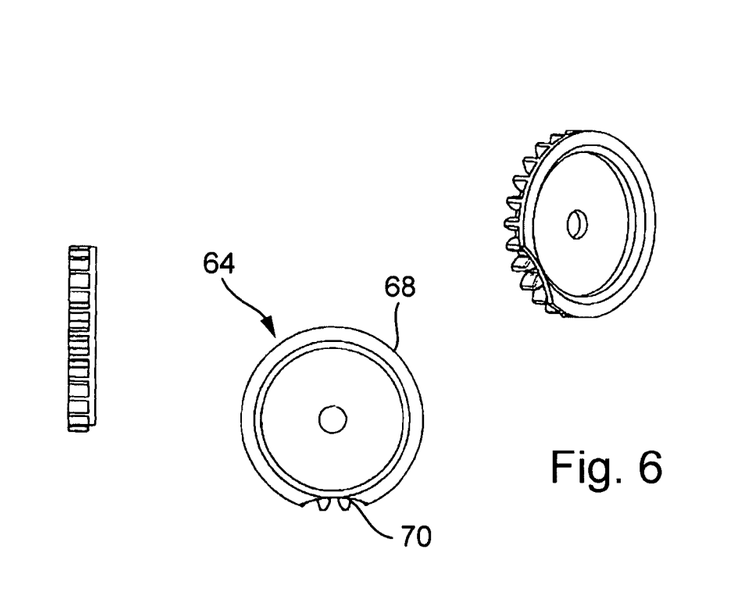

FIG. 6 shows a detailed view of intermediate bevel gear 64. Each intermediate bevel gear 62 or 64 has a straight gear section and a beveled gear section. The straight gear section furthermore has a rim or a lip 68, which is provided, e.g., for the avoidance of an axial movement of tandem gears 28, 30, when coupling with intermediary gears 62 or 64. Intermediary gear 62 is provided for the engagement into first tandem gear 28, and second intermediary gear 64 is provided for engagement into second tandem gear 30. Lip or rim 68, which extend around intermediary gears 64 further have access openings which are provided according to the axial offset and the radius of tandem wheels 28, 30. This means, that opening 70 allows tandem gears 28, 30 to pass intermediary gears 62 or 64, when tandem gear assembly 34 is moved axially with a rotation of threaded spindle 20.

Figure 7:
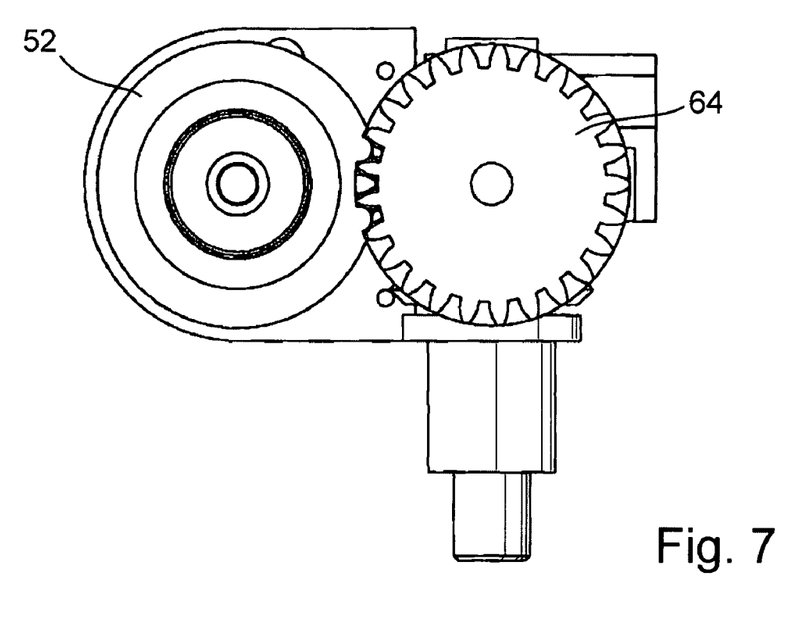

FIG. 7 shows an end view of switching unit 52 for shifting, which is engaged (here) into second intermediary gear 64.

Figure 7A:
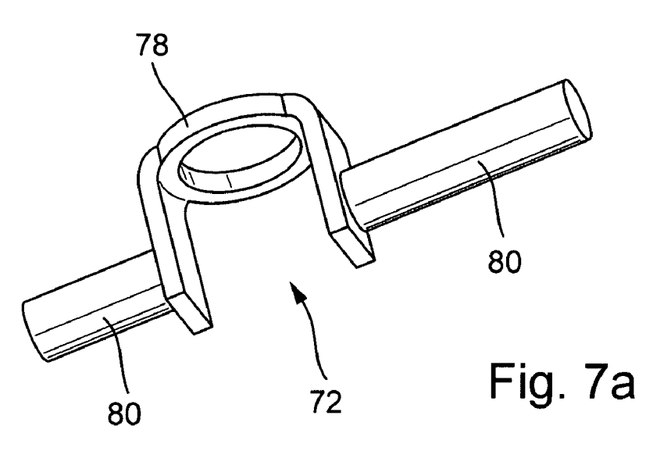

FIG. 7a shows a detail view of positioning device 72. Switching unit 52 for shifting furthermore comprises teeth 74. In particular, two teeth 74 are formed, so that a rotation of the engaging gear is avoided, when switching unit 52 for shifting is engaged with the engaging gear. This means that teeth 74, which are provided at switching unit 52 for shifting, avoid a rotation of intermediary gear 64 during the selection cycle. The bevel gear section of bevel gear 62 or 64 is provided for engagement with bevel gear 76, which is coupled non-rotatably with shifting shaft 66 for shifting and laying out transmission gears. In particular, it is provided that the rotation axis of bevel gear 76 is perpendicular to the rotation axes of gears 62, 64. Positioning device 72 has an annular section, which is rotatably mounted on shift shaft 66, as well as axial protrusions, comprising shafts 80, which are provided to provide intermediary gears 62 and 64 around axis 82 of shift shaft 66. It can be provided that at least one of shafts 80 of positioning device 72 extends into housing 58, in order to avoid a rotation of positioning device 72 around axis 82 of shift shaft 66.

Figure 8:
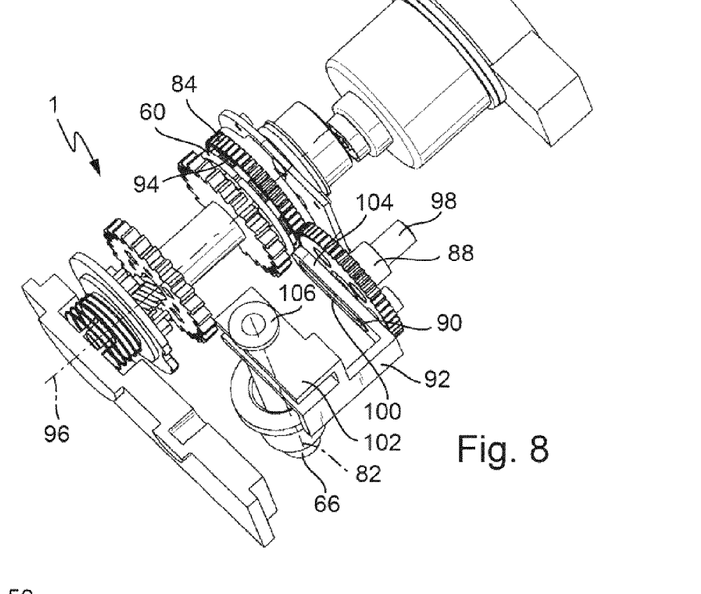

FIG. 8 shows a three-dimensional view of gear selection mechanism 14. Selection mechanism 14 has selection gear 84, elastic or resilient piece 86, selection bolt gear 88, eccentric (selection) drive bolt 90, and selector fork 92. Selector gear 84 has a gear section, a shoulder, an annular cutout or notched section (not shown), and axial lobes or ears 94. The annular cutout or notched section of the selector gear 84 has cutouts or notches, which are provided for the coupling with the axial or radial ears or lobes 44 of the tandem gear 28. Axial lobes or ears 94 have an outer cutout or notched section, which is provided for holding elastic or resilient part 86. During the installation on axial lobes or ears 94, the diameter of elastic or resilient part 86 increases. This means, the outer radius of the cutout or notch relative to central axle 96 is larger than the inner diameter of elastic or resilient piece 86 in its free state. Therefore, through the pressing force of elastic or resilient part 86, elastic or resilient part 86 is held in the cutout or notched area of axial lobes or ears 94. Selector gear 84 is rotatably connected with threaded spindle 20, as it has been previously described. Selector gear 66 is axially positioned on threaded spindle 20 through the shoulder section, which is not shown.

Selector bolt gear 88 has a teethed section, and an assembly opening for a bolt, wherein the assembly opening is positioned in the annular surface of the teethed section. Eccentric selector drive bolt 90 is inserted into the assembly opening of selector bolt gear 88 for the bolt. The eccentric selector drive bolt is integral with selector bolt gear 88. Selector bolt gear 88 is mounted non-rotatably on a shaft 98, which is mounted to the housing, or supported in the housing, which is not shown in the figures. Eccentric selector drive bolt 90 is disposed in transversal slot 100 in selector fork 92. Selector fork 92, furthermore, comprises shift shaft connector fork 102 and eccentric bolt connecting arm 104. In other words, shift shaft connecting fork 102 and eccentric bolt connecting arm 104 extend in parallel. Eccentric bolt connecting arm 104 is parallel to the annular surface of the teethed section of selector bolt gear 88, and abuts to this annular surface. Through eccentric bolt connecting arm 104, which abuts to selector bolt gear 88, a rotation of selector fork 92 around axis 96 is avoided.

Shift shaft 66 has a bevel or bevel tooth section and a shoulder, which is not shown, and a cutout or notch, which is provided to receive a holding clip. The diameter of the opening in shift shaft connecting fork 104 of selector fork 92 is smaller than the bevel or bevel tooth section of shift shaft 66. Therefore, a bottom surface of shift shaft connecting fork 102 abuts to the shoulder of shift shaft 66. Holding clip 106 furthermore, positions selector fork 92 in an axial manner on shift shaft 66, so that selector fork 92 is held between holding clip 106 and the shaft shoulder. Bevel gear 76 has a beveled teething, which is provided, to engage into the beveled teething section of shift shaft 66. Gear 76 is axially positioned at the upper side, when the coupling with intermediary gears 62 and 64, and at the bottom side of the housing, which is not shown. Beveled gear 76 is disposed on the bevel teething section of shift shaft 66. Positioning device 72 is disposed on the upper side of bevel gear 76.

The number of teeth on the gears, the number of ears or lobes, the number of slots, and the number of positions of the unidirectional freewheel clutch, which will be addressed in another section of this disclosure, are multiples of the number of axial positions, which are required for shift shaft 66. It can be provided that shift shaft 66 requires four axial positions. Selector gear 84 thus has eight axial lobes or ears 94. First tandem gear 28 thus has four axial lobes or ears 44, eight axial protrusions 38 and 32 teeth. The second tandem gear thus has eight first slots 46, eight longitudinal second slots 50 and 32 teeth. Intermediary gears 62 and 64 thus have 32 teeth on the respective straight tooth sections. Switching unit 52 for shifting thus has four axial protrusions 54. The unidirectional freewheeling clutch, which is not shown, has eight positions in circumferential direction.

The single motor transmission shifting mechanism 1 allows a motion of shift shaft 66 in an axial direction and a rotation of shift shaft 66 for shifting and laying out a gear or of gears of the transmission, which is not shown. In order to adjust an axial position of the shift shaft, electric motor 16 turns in a first direction. The speed of the electric motor is reduced, and through the reduction gear the torque is proportionally increased before transmission to the threaded spindle, or transfer into threaded spindle 20. Tandem gear assembly 34 is moved in a direction, where an approach to selector gear 84 is performed, through the engagement with threaded spindle 20. While tandem gear assembly 34 approaches selector gear 84, axial protrusions 54 of tandem gear 28 engage into the annular cutout or notched area of selector gear 84. The outer set of axial protrusions 38 engages into the intermediary space between axial protrusions 94 of selector gear 84, and resilient or elastic part 86. Resilient or elastic part 86 radially expands during the installation of first tandem gear 28, and then presses against the grooved surface of axial protrusions 38. Therefore, it is avoided, that the first tandem gear disengages from selector gear 84, without elastic or resilient piece 86 being removed from the grooved surface of axial protrusions 38, whereby a shock free or soft engagement between tandem gear assembly 34 and selector gear 84 is assured.

As soon as tandem gear assembly 34 is completely positioned or located in selector gear 84, tandem gear 28 cannot move axially along threaded spindle 20 anymore, and tandem gear assembly 34 starts to rotate with threaded spindle 20. The axial motion of tandem gear assembly 34 is sufficient to avoid that tandem gears 28 and 30 engage with intermediary gears 62 or 64, wherein a rotation of tandem gear 28 is enabled. The rotation of tandem gear 28 is transferred to selector gear 88. Under certain conditions tandem gear 28 rotates selector gear 84 through the engagement between ears or lobes 44, and the not shown indentations or notches. According to another aspect, tandem gear 28 rotates selector gear 84 through the engagement between protrusions 38 and axial lobes or ears 94. Selector gear 84 rotates bolt gear 88 through a teeth engagement. When selector bolt gear 88 rotates, eccentric selector drive bolt 90 rotates. A rotation of selector drive bolt 90 is transmitted through the combination of laterally extending slot 100 and the restricted motion of shift shaft 66 in the housing (not shown) into an axial motion. This means that a rotation of the eccentric selector drive bolt moves the shift shaft in an axial manner. Through controlling the number of rotations of electric motor 16 (or its motor shaft), a suitable axial position of shift shaft 66 can be adjusted. A slight rotation of the electric motor or its shaft in a second rotation brings a unidirectional freewheeling clutch into engagement, which is provided to position selector gear 84 with higher precision relative to the housing, which is not shown. An improved position of selector gear 84 is transferred into an axial position of the shift shaft through selector bolt gear 88, wherein a precise axial position of shift shaft 66 is assured.

As soon as the not shown unidirectional freewheeling clutch is engaged through selector gear 84, an additional rotation of selector gear 84 and tandem gear assembly 34 is avoided, wherein tandem gear assembly 84 is caused to move axially along threaded spindle 20, when motor 16, or its motor shaft rotate in a second direction. The axial force acting upon tandem gear 108 releases or removes elastic or resilient part 86, wherein tandem gear assembly 34 is enabled to move axially in the direction of switching unit 52 for shifting operations. The rotation position of tandem gear assembly 34 is maintained through the engagement with selector gear 84 and intermediary gears 62 and 64. This means that when tandem gear assembly 34 begins to axially move along threaded spindle 20, tandem gear 28 is in rotation contact with selector gear 84, which, on the other hand, is positioned in rotation direction through the unidirectional freewheeling clutch, which is not shown. Before tandem gear 28 is decoupled in rotation from selector gear 84, the teeth of tandem gear 28 engage into intermediary gear 62. Intermediary gear 62 is positioned in rotation through the engagement of teeth 74 on shift unit 52 for shifting with intermediary gear 64, which is coupled in rotation with intermediary gear 62 through bevel gear 76. When tandem gear assembly 34 moves further along threaded spindle 20, the teeth of tandem gear 30 engage with intermediary gear 64, which, as described at another location in this patent, is positioned in rotation through switching unit 52 for shifting operation, before tandem gear 28 disengages from intermediary gear 62. Therefore, the rotation position of tandem gear assembly 34 is controlled during its entire axial motion along threaded spindle 20.

When tandem gear 30 approaches switching unit 52 for shifting operation, axial protrusions 54 of switching unit 52 for shifting operation engage into slots 46 or 50 of tandem gear 30. It depends on the rotation position of tandem gear 30, if protrusions 54 engage into slots 46 or 50. This means that slot 46 corresponds to a first rotation position of second tandem gear 30, or is associated with it, and second slot 50 corresponds to a second rotation position of second tandem gear 30, or is associated with it.

When protrusions 54 engage into first slots 46, the shoulders of protrusions 54 are located along threaded spindle 20 at the annular surface of tandem gear 30, during the further motion of tandem gear assembly 34. In a continued motion, or during continued migration, spring 56 is compressed, until switching unit 52 for shifting operation contacts shoulder 24 on threaded spindle 20, wherein a further migration of tandem gear assembly 34 along threaded spindle 20 is avoided. In this position, teeth 74 on switching unit 52 for shifting operation are disengaged from intermediary gear 64, and tandem gear 28 engages into intermediary gear 62. This position is shown in FIG. 4. A continued rotation of threaded spindle 20 causes a rotation of tandem gear 28, and intermediary gear 62. A rotation of intermediary gear 62 is transmitted into shift shaft 66 or transferred to shift shaft 66 through bevel gear 76. Therefore, shift shaft 66 is rotated in a first direction, in order to shift a gear, or lay a gear out in the transmission.

When protrusions 54 engage into second slots 50, the shoulders of protrusions 54 run through second slots 50, and the annular surface of switching gear unit 52 for shifting operation abuts to the annular surface of tandem gear assembly 30, during a further migration of tandem gear assembly 34 along threaded spindle 20. During continued migration, spring 56 is compressed, until switching unit 52 for shifting operations contacts shoulder 24 on threaded spindle 20, whereby an additional migration of the tandem gear assembly along threaded spindle 20 is avoided. In this position, the teeth on switching unit 52 for shifting operation are disengaged from intermediary gear 64, and tandem gear 30 engages with intermediary gear 64. FIG. 5 shows this position. A continued rotation of threaded spindle 20 causes a rotation of tandem gear 30 and intermediary gear 64. A rotation of intermediary gear 64 is transferred to shift shaft 66 through bevel gear 76. Therefore, the shift shaft is rotated in a second direction for shifting or outlaying a gear or gears in the transmission.

Figures 9, 9A:
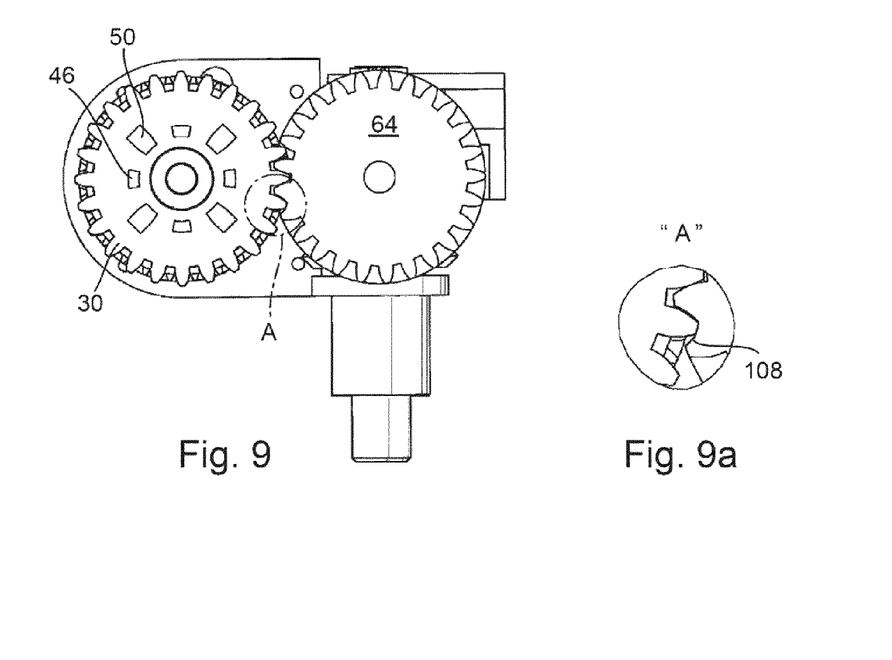

FIG. 9 shows an end view of the tandem gear 30, and intermediary gear 64.

FIG. 9a shows a detail view of cutout or locator feature 108 of intermediary gear 64. During a rotation of intermediary gears 62 and 64 through tandem gears 28 or 30, lips or rim 68 avoid an axial migration of tandem gear assembly 34 along threaded spindle 20.

During shifting and outlaying a gear in the transmission, the direction of rotation of motor 16 is reversed. An axial migration of the tandem gear assembly through the lip or the rim is avoided, until cutout area 108 is aligned, in order to allow tandem gear 28 or 30, to disengage from tandem gear 62 or 64. The cut-out, or locator feature 70 of intermediary gear 64 avoids a further rotation of tandem gear 30 and intermediary gear 64, wherein cutout or notch 70 is aligned with tandem gear 30. During a respective alignment, spring 56 presses switching unit 52 for shifting operation axially against flange 26 of threaded spindle 20. An axial motion of switching unit 52 for shifting operation engages teeth 74 with intermediary gear 64 again, as shown in FIG. 7. Therefore, a rotation of switching unit 52 for shifting operation and of intermediary gear 64 is avoided, wherein, on the other hand, a rotation of bevel gear 76, intermediary gear 62, and tandem gear assembly 74 is avoided, until tandem gear 28 is disengaged from intermediary gear 62, as described also at another location of this disclosure.

Figure 10:
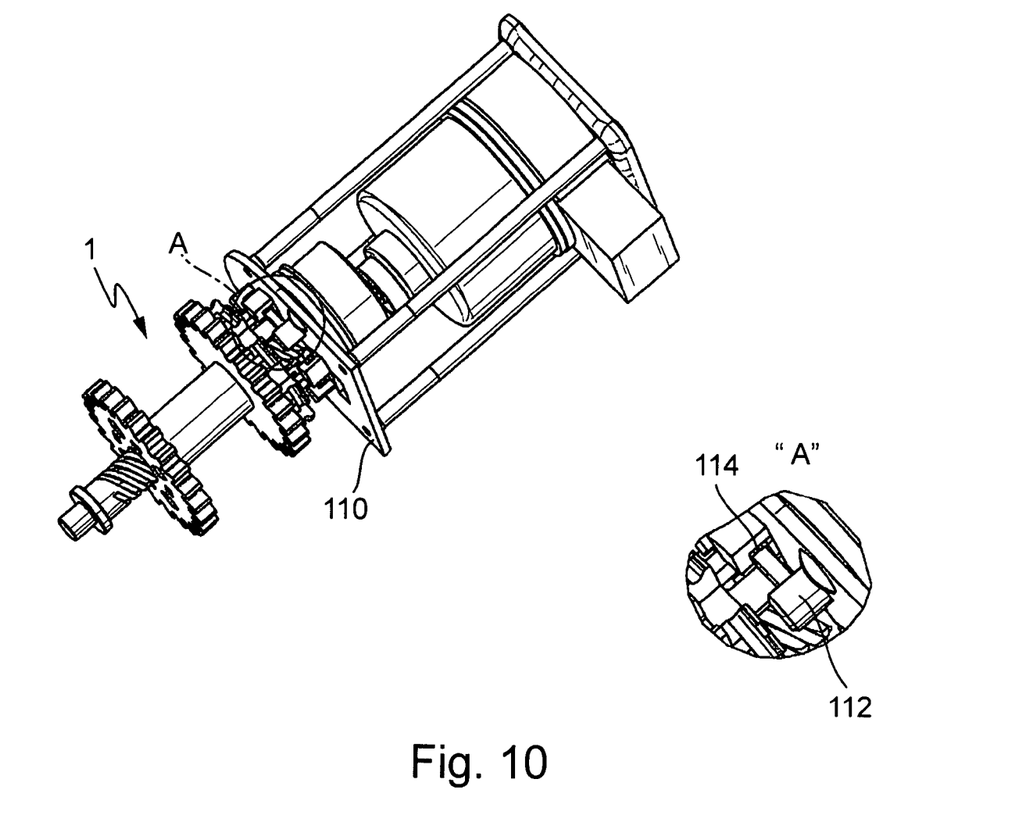
Figure 11:
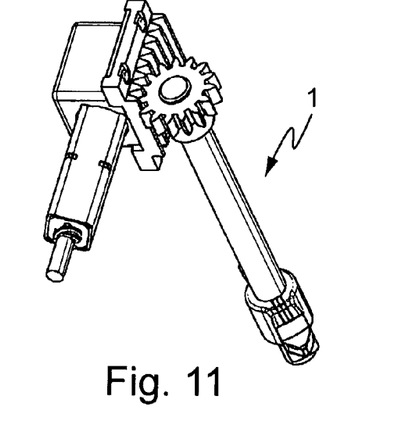
Figure 12:
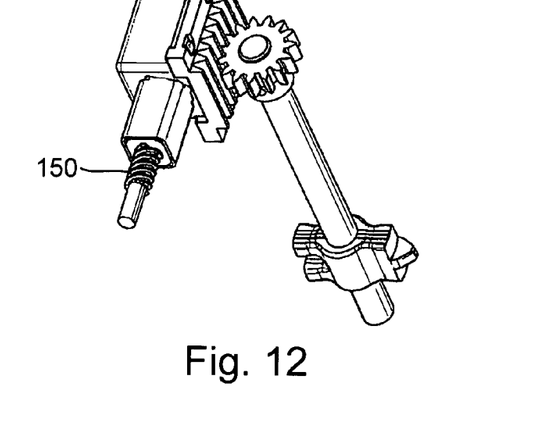
Figure 13:
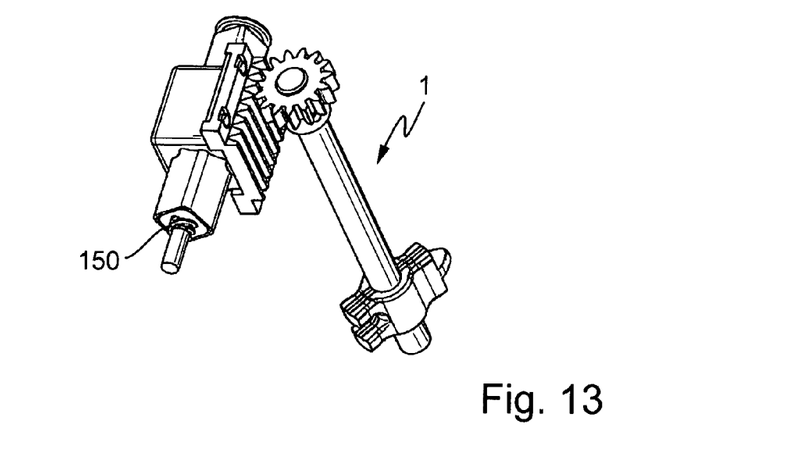
Figure 14:
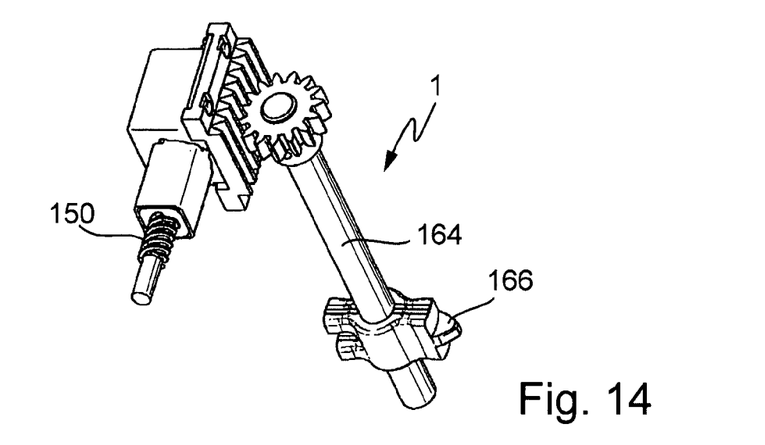
Figure 15:
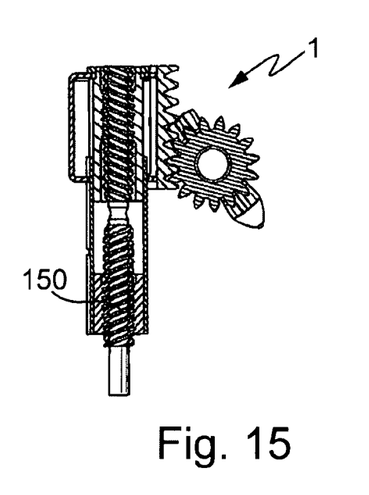
Figure 16:
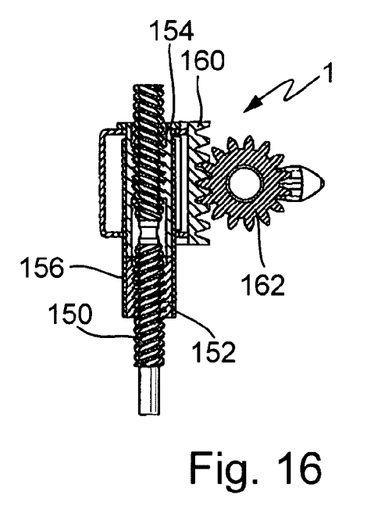
Figure 17:
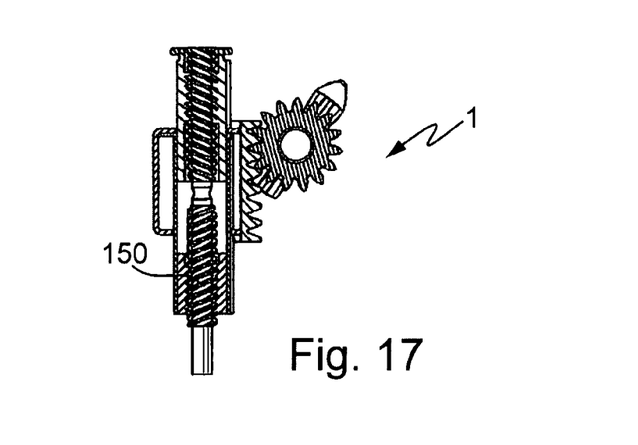
Figure 18A:
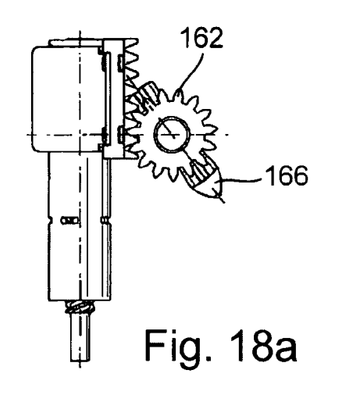
Figure 18B:
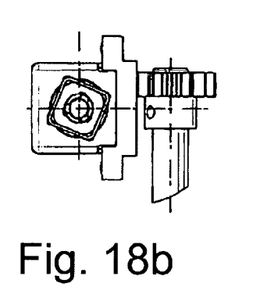
Figure 19A:
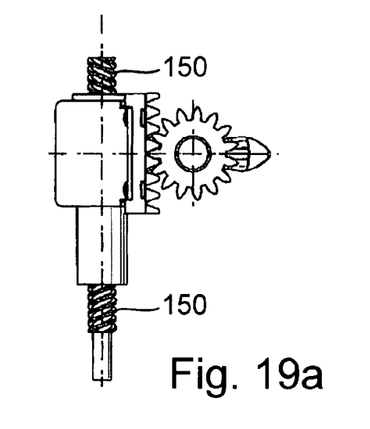
Figure 19B:
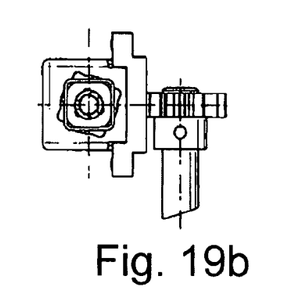
Figure 20A:
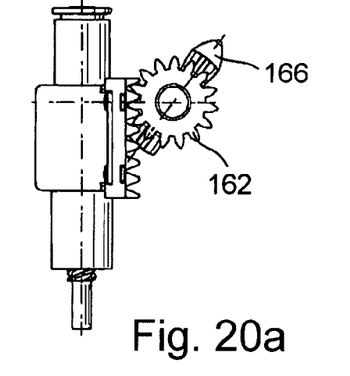
Figure 20B:
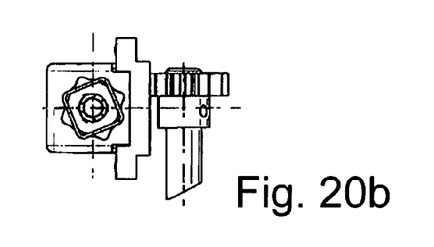

FIG. 10 shows a detail view of gate, or gate feature 110. The single motor transmission shifting mechanism furthermore comprises gate feature 110, in order to assure a correct position of the electric motor, or of the motor shaft of the electric motor. Gate feature 110, or gate 110 has protrusions 112. Tandem gear assembly 34 can rotate freely in cut-outs 114 of the gate feature, or gate 110, when it has the correct position or the correct fit relative to gate feature or gate 110. Protrusions 44 of tandem gear 28 contact protrusions 112 of gate feature, or gate 110, wherein a migration of tandem gear assembly 34 along the threaded spindle, and away from gate feature 110 is avoided, when the rotation position of the tandem gear assembly is not correct, this means, in particular, during the engagement of the unidirectional freewheeling clutch. When the position of freewheeling clutch 28 is corrected, protrusions 44 are clear, or disengaged from protrusions 112, and the tandem gear assembly is free to migrate along threaded spindle 20, or can migrate along threaded spindle 20.

It is appreciated that exemplary single motor transmission shifting mechanism 1 according to the invention, which was described with reference to the FIGS. 1 through 10, is provided, in particular, so that it works with a relatively small electric motor. Thereby, it is provided, in particular, that threaded spindle 20 is preferably only used to switch back and forth between "shifting mode" and "selector mode", so that, in particular, during shifting operations and thereby, contrary to the state of the art, almost no friction losses or reduced friction losses occur at the threaded spindle. Therefore, it is accomplished in this embodiment that the major part of the engine torque of electric motor 16 can be transferred to the output shaft through the shifting shaft. Hereby, it is accomplished that a smaller servo motor, or a smaller electric motor can be used, or a respective higher output torque can be generated with the same engine size, compared to the state of the art.

With reference to the FIGS. 11 through 20b, subsequently an additional exemplary single motor transmission shifting mechanism 1 shall be described, which is schematically partially illustrated in these FIGS. 11-20b in an exemplary manner. In the design according to the FIGS. 11-20b, in particular, a mechanism is emphasized, which relates to the shifting motion for a single motor transmission shifting mechanism 1. This design can be combined, or combinable with any method or any design to generate a selecting motion.

The design of single motor transmission shifting mechanism 1, shown in the FIGS. 11-20b, has a ball screw with two opposite threads, or threaded spindle 150, which can move two nuts 152 and 154 in opposite directions through a rotating motion. Nuts 152, 154 are provided as tubes reaching into each other, and sliding in each other, e.g., with rectangular or square or pentagonal cross section. The nut can, e.g., have such a shape as, e.g., nut 154, or it can be integrated in another part, as, e.g., tube 156. Each nut 2, 4 or each tube 3 has grooves 158, using the corners, in order to contact gear rack 160, in order to generate the necessary motion in both directions through sprocket 162, shaft 164 and shift finger or shift lever 166. These grooves 158 also have to allow a rotation of nuts 152, 154 within gear rack 160.

The shape of nuts 152, 154, or of the tubes depends on the number of rotation positions, which is required for the shifting motion. Four shifting positions require, e.g., a rectangular or square shape (360°/4=90° symmetry), while five positions would require a pentagonal shape (360°/5=72° symmetry). This can be varied according to the requirements, and does not have to maintain a constant space.

Cutout (gate) 168 can, e.g., be provided or required on both sides of the gear rack, so that nuts 152, 154 slide through it and so that they can rotate. In order to generate a motion in both directions, it is provided in an advantageous embodiment that these gates are disposed at an angular offset relative to each other, like, e.g., by half of the angular rotation between the gates. Hereby, it can be assured, that always when a gate is aligned with nut 152 or 154, corners 170 are held at opposite gates in groove 158, wherein gear rack 160, and nut 154 or 152 are held together, in order to move gear rack 160 in a respective direction. Through providing the offset of the gates in the said manner, it is accomplished that the direction of the motion of gear rack 160 is changed at any other location.

During operation, spindle 150 is rotated or driven to rotate through an electric motor, or through a respective drive unit. In the one rotating direction, nuts 152, 154 join, and can then not move anymore along spindle 150, in particular, they block each other, so that therefore the entire unit rotates. This is also known as selection motion and allows nuts 152, 154, or the respective selection mechanism to be positioned in a desired position. In the selected position, the direction of rotation of the electric motor, or of the motor shaft of this electric motor is reserved, wherein an unidirectional freewheeling clutch engages, avoiding a rotation in the selection direction. Since the 152, 154 cannot rotate any further, they move along spindle 150 and away from each other, wherein engaging nut 152 or 154, or nut 152 or 154 engaging gear rack 160, move this gear rack 160, which in turn then moves the sprocket, the shaft and the shifting lever. The motion in this direction is then also called shifting motion.

DESIGNATIONS 1 single motor transmission shifting mechanism
10 selector/shifter switching mechanism
12 shifting mechanism
14 gear selector mechanism
16 electric motor
18 reduction gear
20 threaded spindle
22 support assembly for 20
24 threaded section of 20
26 flange section of 20
28 first tandem gear
30 second tandem gear
32 connection tube
34 tandem gear assembly
36 flange section of 34
38 first axial protrusion of 34
44 axial or radial lobe or axial or radial ear
46 first slot
50 second slot
52 switching unit for shifting
54 stepped axial protrusion of 52
56 coil spring
58 housing
60 selector gear
62 intermediary bevel gear
64 intermediary bevel gear
66 shifting shaft
68 lip or rim of 202 or 204
70 cutout or notch of 68, location feature
72 positioning device
74 tooth of 52
76 bevel gear
78 annular section of 72
80 shaft of 72
82 axle
84 selector gear
86 elastic or resilient part
88 selector bolt gear
90 eccentric selector drive bolt
92 selector fork
94 axial lobe or axial ears
96 central axis
98 shaft
100 transversal slot in 92
102 shifting shaft connector fork
104 eccentric bolt connector arm
106 holding clip
108 location feature, cutout
110 gate, gate feature
112 protrusion of 110
114 cutout
150 threaded spindle
2 152 nut
4 154 nut
3 156 tube
10 158 nut
5 160 gear rack
6 162 sprocket
8 164 shaft
9 166 shifting shaft (shifting finger)
11 168 cutout, gate
12 170 corner

What is claimed is:

1. A single motor transmission shifting mechanism comprising:
   exactly one electric motor (16) for generating drive motions for selecting and for generating drive motions for shifting gears of a motor vehicle transmission device;
   a threaded spindle for switching from a mode in which selection motions can be effectuated, into a mode in which shifting motions can be effectuated; and,
   a shifting shaft, which can be moved in axial direction for selecting, and which can be rotated around its longitudinal axis for shifting;
   wherein all components, transferring the drive load for shifting from the electric motor to the shifting shaft during shifting operation, maintain their axial position relative to the longitudinal axis of the threaded spindle during this shifting operation.

2. The single motor transmission shifting mechanism recited in claim 1, wherein a connection tube (32) with a thread is provided, engaging with its thread into the thread of the threaded spindle, and coupled with two gears (108, 110) in a solid manner.

3. The single motor transmission shifting mechanism recited in claim 2, wherein the relative axial position of the connection tube (32), seen in the direction of the longitudinal axis of the threaded spindle (20), can be changed relative to the threaded spindle (20) through a rotation of the threaded spindle (20), driven by the electric motor (16).

4. The single motor transmission shifting mechanism recited in claim 3, wherein a holding mechanism is provided, through which the axial relative position of the connection tube (32), seen in the direction of the longitudinal axis of the threaded spindle (20), relative to the threaded spindle (20), is maintained during a pivoting motion of the shifting shaft (66), around the longitudinal axis of this shifting shaft (66), driven by the electric motor (16), for shifting a gear.

* * * * *